United States Patent [19]

Gold

[11] 4,331,088

[45] May 25, 1982

[54] MANAGEMENT OF CHEMICAL TOXIC WASTES

[76] Inventor: Louis Gold, 2745 29th St., NW., Washington, D.C. 20008

[21] Appl. No.: 30,991

[22] Filed: Apr. 19, 1979

[51] Int. Cl.$^3$ ............................................... F23G 7/00
[52] U.S. Cl. ................................. 110/346; 110/237; 110/259
[58] Field of Search .................... 110/237, 346, 259; 252/301.1 W; 75/42

[56] References Cited

U.S. PATENT DOCUMENTS

| | | | |
|---|---|---|---|
| 3,418,788 | 12/1968 | Sugimoto | 252/301.1 W |
| 3,537,410 | 11/1970 | Zanft | 110/259 X |
| 3,922,974 | 12/1975 | Hempelmann | 110/237 |
| 4,133,273 | 1/1979 | Glennon | 110/237 X |

FOREIGN PATENT DOCUMENTS

| | | | |
|---|---|---|---|
| 1406059 | 6/1965 | France | 110/237 |
| 1096072 | 12/1967 | United Kingdom | 110/237 |

Primary Examiner—Edward G. Favors

[57] ABSTRACT

Two regimes of vertical shaft furnace operation can be employed to slag encapsulate hazardous chemical wastes. One of these is similar to a method applicable to radioactive wastes, involving the pouring of hot molten slag from a Coal Reactor over the hazardous matter contained in a suitable designed crucible. The other method is especially appropriate for the treatment of chemical wastes that have become mixed with a great deal of soil or other diluent as must be handled as in the case of the Love Canal incident. It consists of feeding the contaminated solid mass into the Coal Reactor with a predetermined amount of coal and limestone that will still admit an adequate heat balance to generate a carefully tailored slag to incorporate the reacted waste feedstock.

3 Claims, No Drawings

MANAGEMENT OF CHEMICAL TOXIC WASTES

BACKGROUND TO THE INVENTION

Conventional methods for dealing with such chemical toxic wastes as represented by the Love Canal crisis have been rejected as inadequate. Many similar disastrous discoveries have added to the immensity of the problem with the prospects of costs that are astronomical. The foundations of a practical solution were indeed discussed with the City of Niagra Falls in Aug. 1978, followed by a confidential disclosure more recently.

The Coal Reactor version of a vertical shaft furnace is envisioned as the best approach to the detoxification of hazardous chemical wastes, offering on site operation to minimize handling and transportation. In this fashion a clean, inexpensive energy source resulting from the burning of coal can give rise to an adequate thermal reservoir and slag volume for the treatment of such wastes, taking full advantage of a new type of utility station awaiting development. The symbiotic operation inherent in the innovative response to the health dangers posed by chemical toxic residues from industrial plants virtually insures successful resolution of an increasingly growing environmental menace for which there may be no other realistic solution.

SUMMARY OF THE INVENTION

Coal Reactor power stations of the future for the production of an abundance of clean energy can be adapted to remove toxic chemical wastes from the environment in offering a molten slag output that will encapsulate the pyrolyzed decomposition products from the high temperature exposure. The limestone, normally required to purge the impurities from even the poorest grades of coal and regulated additions of garbage, forms the basis of a slag (a mixture of oxides of calcium, magnesium, aluminium, silicon, etc.) that can react with the decomposed residues of the toxic wastes. Continuous operation is possible by feeding the dangerous wastes together with the lime and coal with possibly some municipal wastes allotments into the vertical shaft furnace to wind up with a slag that can be safely handled and disposed of keeping costs at a reasonable level. An alternative batch process entails pouring a suitably tailored slag over the contaminated mass placed inside a crucible whereupon, following a prolonged coating period, the decomposed residue is sealed into the solidified mass resulting.

DETAILED DESCRIPTION OF THE INVENTION

The extent and chemical composition of the toxic waste matter to be treated provide vital information as to the scale of operation and the power level of the Coal Reactor needed to insure an adequate heat balance with an energy output to make the installation self-contained. Having decided on the throughput capacity, the amount of coal and limestone needed can be estimated and the size of the coal Reactor prescribed. Since tons of material may be generally expected on a daily basis, the power output of the station will fall well into the multi-megawatt range.

In the mode chosen for the treatment of the hazardous wastes involves the direct addition to the feedstock of limestone and coal at the top of the vertical shaft furnace, the danger of the toxic decomposition products escaping with the normal gaseous effluent of the Coal Reactor can be guarded against by invoking the reflux arrangement (described in U.S. Pat. No. 4,080,196). The so-called upcomer conduit for the escaping gases should be placed below the calcination zone of the reactor vessel.

The other manner of encapsulation by the slag addition to the toxic material resting at the bottom of the crucible may need to be accompanied by chemical additives to render the decomposition products from the high temperature exposure harmless. Thus, the use of a lime covering over the toxic charge may prove desirable. The effectiveness of whatever chemistry is selected to tie up toxic vapors produced by the pouring of the hot molten slag into the charged crucible will need evaluation by samplings of the resultant encapsulated products.

The latter mode of treatment requires a sufficiently long interval to permit mixing of the slag with the waste material and its decomposition products, a condition favored by employing large enough batches to slow down the cooling and the ensuing solidification. The crucible geometry also poses an important factor in this regard since the surface to volume ration plays an important role in the rate of cooling.

So for both modes of thermal destruction of toxic wastes a squat-cylindrically shaped crucible is to be preferred for closer control of the solidification in allowing ample time for degassing and the formation of sound castings that are relatively stress free. The porosity of the solidified mass represents another important consideration in minimizing leaching during the course of storage. The reduced surface to volume ratio will support the objective of curbing the overall weathering of the encapsulation product in reinforcing the effect of low porosity itself.

Indeed, ultrasonic diagnostics is advised to detect any flaws in the final product, a procedure that should help guide determination of the conditions necessary for satisfactory results. Other diagnostic tools may be invoked such as x-ray and chemical analysis to arrive at an understanding of the fate of the hazardous chemical wastes when subjected to the thermal destruction treatment. By such means the engineering specifications for a wholly new technology can be expected to evolve.

What is claimed is:

1. A method of chemical toxic wastes management by thermal decomposition using a coal reactor as the heat source and slag producer for purging and encapsulation comprising the steps:
    (a) Feeding said toxic wastes via a seal at the top of the coal reactor together with adjusted input of coal and limestone to effect direct thermal decomposition and purging of the decomposition products and wherein said wastes, coal, and limestone form a stockline located above a combustion zone,
    (b) controlling the flow of the resultant gaseous effluent by establishing a reflux mode forcing the said effluent to exit the coal reactor via an upcomer conduit located intermediate the stockline and the combustion zone to maintain complete removal of toxic pollutants,
    (c) Encapsulating the residual solid toxic pollutants with the highly reactive hot slag, the encapsulated product then removed at the bottom of the coal reactor in sufficiently large batches to allow gradual cooling in a crucible designed to slow solidification conducive for yielding sound castings.

2. A method of claim 1 wherein the feed is mixed with municipal garbage to enhance the fuel valve of the effluent.

3. A method of detoxifying chemical wastes comprising the steps:
   (a) generating a hot motten slag in a coal reactor,
   (b) feeding said wastes into a crucible located outside of the coal reactor,
   (c) tapping said slag into the crucible and encapsulating said wastes; said crucible designed to prolong the thermal decomposition period and allow gradual cooling of the resultant encapsulated product.

* * * * *